United States Patent
Chen et al.

(10) Patent No.: US 12,437,581 B2
(45) Date of Patent: Oct. 7, 2025

(54) TRAINING SYSTEM, TRAINING METHOD AND RECOGNITION SYSTEM

(71) Applicant: REALTEK SEMICONDUCTOR CORP., Hsinchu (TW)

(72) Inventors: Chien-Hao Chen, Hsinchu (TW); Chih-Wei Wu, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 298 days.

(21) Appl. No.: 18/236,142

(22) Filed: Aug. 21, 2023

(65) Prior Publication Data
US 2024/0273944 A1    Aug. 15, 2024

(30) Foreign Application Priority Data
Feb. 13, 2023  (TW) .................................. 112105064

(51) Int. Cl.
*G06V 40/16*   (2022.01)
*G06V 10/82*   (2022.01)

(52) U.S. Cl.
CPC ............ *G06V 40/172* (2022.01); *G06V 10/82* (2022.01)

(58) Field of Classification Search
CPC ..... G06V 40/172; G06V 10/82; G06V 10/764
See application file for complete search history.

(56) References Cited

U.S. PATENT DOCUMENTS

| | | | |
|---|---|---|---|
| 2018/0315157 A1 | 11/2018 | Ould-Ahmed-Vall et al. | |
| 2022/0261593 A1 | 8/2022 | Yu et al. | |
| 2022/0318557 A1* | 10/2022 | Mohseni | G06V 20/56 |

FOREIGN PATENT DOCUMENTS

| | | |
|---|---|---|
| CN | 113167860 A | 7/2021 |
| WO | WO 2022/216506 A1 | 10/2022 |

OTHER PUBLICATIONS

Cao et al., "VGGFace2: A dataset for recognising faces across pose and age", May 13, 2018, total 11 pages.
Toledo et al., "Face Reconstruction with Variational Autoencoder and Face Masks", Dec. 3, 2021, total 12 pages.

* cited by examiner

*Primary Examiner* — Christopher Wait
(74) *Attorney, Agent, or Firm* — Birch, Stewart, Kolasch & Birch, LLP (57) ABSTRACT

A training system, a training method, and a recognition system are provided. The training method is used to train a neural network module including: an encoder module, a shared decoder module, a synthesis module, and a classification module. The training method includes performing in a training epoch: repeatedly executing: taking a training image from a training set as an input image, obtaining a first loss based on training feature images of the training image and the feature images corresponding to the training image, and obtaining a second loss based on a classification marker of the training image and a classification generated by the classification module in correspondence with the training image; and updating first parameters and second parameters based on an average value of all the first losses and an average value of all the second losses obtained in the preceding step and an update algorithm.

20 Claims, 8 Drawing Sheets

TRAINING SYSTEM, TRAINING METHOD AND RECOGNITION SYSTEM

CROSS-REFERENCE TO RELATED APPLICATION

This non-provisional application claims priority under 35 U.S.C. § 119(a) to Patent Application No. 112105064 filed in Taiwan, R.O.C. on Feb. 13, 2023, the entire contents of which are hereby incorporated by reference.

BACKGROUND

Technical Field

The instant disclosure is related to the field of image recognition, especially technologies applying neural networks to image recognition.

Related Art

Nowadays, face recognition is fairly widely applied. However, the ability to recognize the identity of a current personnel is usually derived from the output of a learning model for face recognition: the output of a face recognition learning model is a one-dimensional vector, the facial vectors of people are recorded through registration beforehand, and then the identity of the current personnel can be obtained through various distance calculation methods (such as Euclidean distance or cosine distance). However, although the output vectors of the face recognition learning model represent relevant information of the face of a tester, the arrangement of the output vectors is meaningless. This arrangement is completely decided by the face recognition learning model itself through iterative learning of data. However, as far as our human perceptions go, the information of the face of a person we record mainly comes from facial feature information of the person. We can clearly recognize the facial features of this person and then figure out the identity of the tester through the facial features of this person. As a result, when a part of the facial feature information is masked by an object (such as by a face mask), we humans can still perform determination based on the eyes of the tester. However, we have no means of knowing the locations of the vectors in which the eye information is recorded in a face recognition learning model, and therefore such vectors may generate errors in identity recognition because the facial features are partially masked.

SUMMARY

In view of this, the instant disclosure provides a training system, a training method, and a recognition system in order to improve current technical issues.

An embodiment of the instant disclosure provides a training system. The training system comprises at least one processing unit and a neural network module. The neural network module comprises: an encoder module having a plurality of first parameters and configured to receive an input image and generate a plurality of first tensors, wherein the first tensors comprise a plurality of feature tensors, and the feature tensors correspond to a plurality of features of a face: a shared decoder module having a plurality of second parameters and configured to receive the feature tensors so as to generate a plurality of feature images: a synthesis module configured to receive the first tensors so as to generate a vector; and a classification module configured to receive the vector so as to generate a classification. The at least one processing unit is configured to perform in a training epoch: repetitively executing: taking a training image from a training set as the input image, obtaining a first loss based on a plurality of training feature images of the training image and the feature images corresponding to the training image, and obtaining a second loss based on a classification label of the training image and the classification generated by the classification module in correspondence with the training image; and updating the first parameters and the second parameters based on an average value of all of the first losses obtained in the previous step, an average value of all of the second losses obtained in the previous step, and an updating algorithm.

An embodiment of the instant disclosure provides a training method used to train a neural network module and executed by at least one processing unit. The neural network module comprises: an encoder module having a plurality of first parameters and configured to receive an input image and output a plurality of first tensors, wherein the first tensors comprise a plurality of feature tensors, and the feature tensors correspond to a plurality of features of a face: a shared decoder module having a plurality of second parameters and configured to receive the feature tensors so as to generate a plurality of feature images: a synthesis module configured to receive the first tensors so as to generate a vector; and a classification module configured to receive the vector so as to generate a classification; and the training method comprises performing in a training epoch: repetitively executing: taking a training image from a training set as the input image, obtaining a first loss based on a plurality of training feature images of the training image and the feature images corresponding to the training image, and obtaining a second loss based on a classification label of the training image and the classification generated by the classification module in correspondence with the training image; and updating the first parameters and the second parameters based on an average value of all of the first losses obtained in the previous step, an average value of all of the second losses obtained in the previous step, and an updating algorithm.

An embodiment of the instant disclosure provides a recognition system comprising at least one processing unit, a recognition encoder module, a recognition synthesis module and a memory unit. The recognition encoder module is configured to store trained ones of the first parameters and configured to receive an input image and generate a plurality of tensors based on the trained ones of the first parameters, and a plurality of feature tensors of the tensors correspond to a plurality of features of a face. The recognition synthesis module is configured to receive the tensors so as to generate an output vector corresponding to the input image. The memory unit is configured to store a first vector set, wherein the first vector set comprises at least one first vector, and the at least one first vector is the output vector generated by the recognition encoder module and the recognition synthesis module in correspondence with at least one image of a user. The at least one processing unit is configured to execute: receiving an image to be recognized; taking the image to be recognized as the input image and inputting the image to be recognized to the recognition encoder module, and obtaining a second vector corresponding to the image to be recognized from the output vector of the recognition synthesis module; and determining whether the image to be recognized corresponds to the user based on a distance between the second vector and the first vector set of the user.

An embodiment of the instant disclosure provides a recognition system comprising at least one processing unit, a recognition encoder module, a recognition synthesis module, and a memory unit. The recognition encoder module is configured to store trained ones of the first parameters and configured to receive an input image and generate a plurality of tensors based on the trained ones of the first parameters, and a plurality of feature tensors of the tensors correspond to a plurality of features of a face. The recognition synthesis module is configured to receive the tensors so as to generate an output vector corresponding to the input image. The memory unit is configured to store at least one set of user vectors, wherein each set of the user vectors comprises at least one first vector, and the at least one vector of each set of the user vectors is the output vector generated by the recognition encoder module and the recognition synthesis module in correspondence with at least one image of a corresponding one of a plurality of users. The at least one processing unit is configured to execute: receiving an image to be recognized; taking the image to be recognized as the input image and inputting the image to be recognized to the recognition encoder module, and obtaining a second vector corresponding to the image to be recognized from the output vector of the recognition synthesis module; and determining whether the image to be recognized corresponds to one of the users based on distances between the second vector and the first vector sets constituted by the at least one set of user vectors.

An embodiment of the instant disclosure provides a recognition system. A plurality of trained ones of first parameters of the recognition system adopts first parameters of the encoder module obtained by a training of the aforementioned training system.

As above, the training system and the training method provided by some embodiments of the instant disclosure adopt the structure of encoder module-shared decoder module. During the process of model training, losses constituted by errors between restored images of features generated by the shared decoder module and training feature images corresponding to the features are added to limit the process of the model training. Besides, in some embodiments of the instant disclosure, during the processing of the model training, using restoration processes of the features of a face of a shared decoder module at the same time allows the shared decoder module to restore the appearances of the facial features in response to different facial feature information, and thus forcefully make the inputs of the shared decoder module just include information about facial features. As a result, regarding the vectors generated by the synthesis module, a part of the dimensions are limited to a plurality of features of a face. The recognition system provided by some embodiments of the instant disclosure utilizes the vectors generated by a neural network trained in this way and is thus still able to complete identity recognition through other unmasked feature information when some features of the face in the image to be recognized is masked.

BRIEF DESCRIPTION OF THE DRAWINGS

The instant disclosure will become more fully understood from the detailed description given herein below for illustration only, and therefore not limitative of the instant disclosure, wherein:

FIG. 5-1 illustrates a schematic module diagram of a training system according to some embodiments of the instant disclosure:

FIG. 5-2 illustrates schematic diagrams showing correspondences between feature images and training feature images according to some embodiments of the instant disclosure:

DETAILED DESCRIPTION

The foregoing and other technical contents, features, and effects of the instant disclosure can be clearly presented below in detailed description with reference to embodiments of the accompanying drawings. Any modification to the structure, change to the proportional relationship, or adjustment on the size without affecting the effects and the objectives that can be achieved by the instant disclosure should fall within the scope of the technical content disclosed by the instant disclosure. In all drawings, identical symbols are used to denote identical or similar elements. In the following detailed description, the term "connect" may refer to any means of direct or indirect connection, or wired or wireless connection. In the instant disclosure, ordinals such as "first" or "second" are used to differentiate or refer to identical or similar elements or structures and do not necessarily imply the order of such elements in the system. It should be understood that, under some conditions or configurations, the ordinals may be used interchangeably and do not affect the implementation of the instant disclosure.

Figure 1:
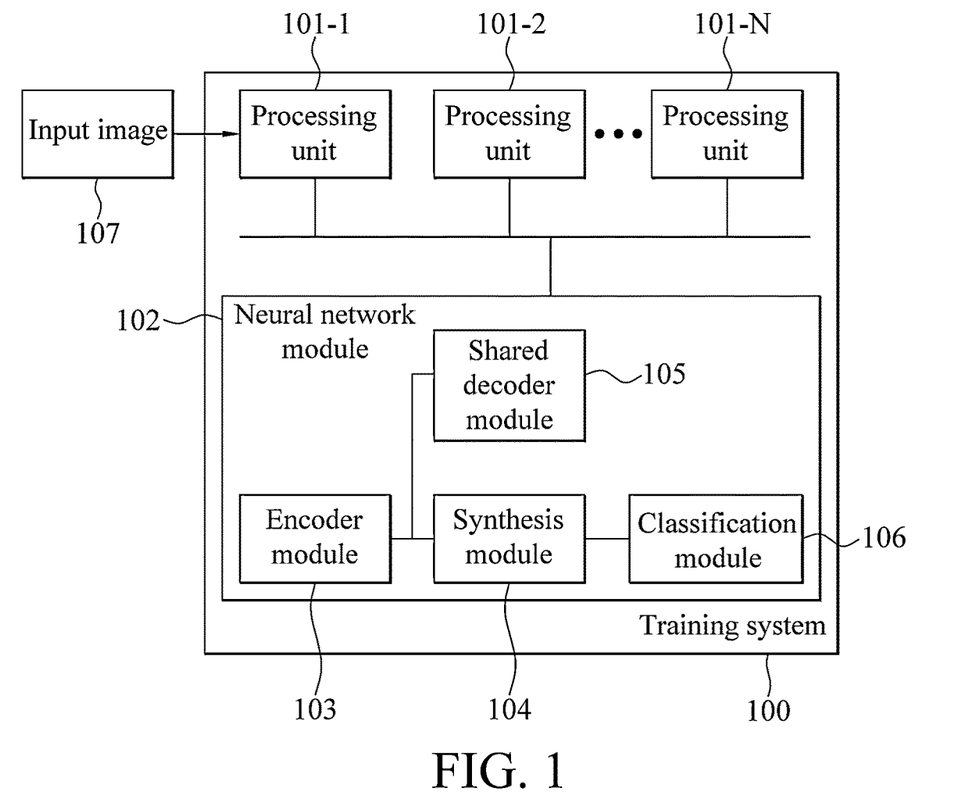
FIG. 1 illustrates a schematic block diagram of a training system according to an embodiment of the instant disclosure.

FIG. 1 illustrates a schematic block diagram of a training system according to an embodiment of the instant disclosure. Please refer to FIG. 1. The training system 100 comprises processing units 101-1, 101-2 through 101-N and a neural network module 102. N is a positive integer and the value of N may be 1. The processing units 101-1 through 101-N are configured to obtain an input image 107. The neural network module 102 comprises an encoder module 103, a synthesis module 104, a shared decoder module 105, and a classification module 106.

The encoder module 103 has a plurality of first parameters. The encoder module 103 is configured to receive the input image 107 through the processing units 101-1 through 101-N, and generate a plurality of first tensors corresponding to the input image 107 based on the first parameters. The first tensors comprise a plurality of feature tensors, and the feature tensors correspond to a plurality of features of a face. The following will illustrate using specific examples. The shared decoder module 105 has a plurality of second parameters. The shared decoder module 105 is configured to receive the feature tensors generated by the encoder module 103, and generate a feature image in response to each of the received feature tensors based on the second parameters. The synthesis module 104 is configured to receive the first tensors generated by the encoder module 103 and generate a vector based on the received first tensors. The classification module 106 is configured to receive the vector generated by the synthesis module 104 and generate a classification corresponding to the received vector.

In some embodiments of the instant disclosure, at the beginning of the steps of the training method, the processing units 101-1, 101-2 through 101-N first randomly set initial values of the first parameters and initial values of the second parameters based on a probability distribution (such as a normal distribution). The processing units 101-1, 101-2 through 101-N may utilize random functions emulated using software provided by general programming languages, such as the random( ) function of the random module in Python to randomly set the initial values of the first parameters and the initial values of the second parameters.

Figure 2:
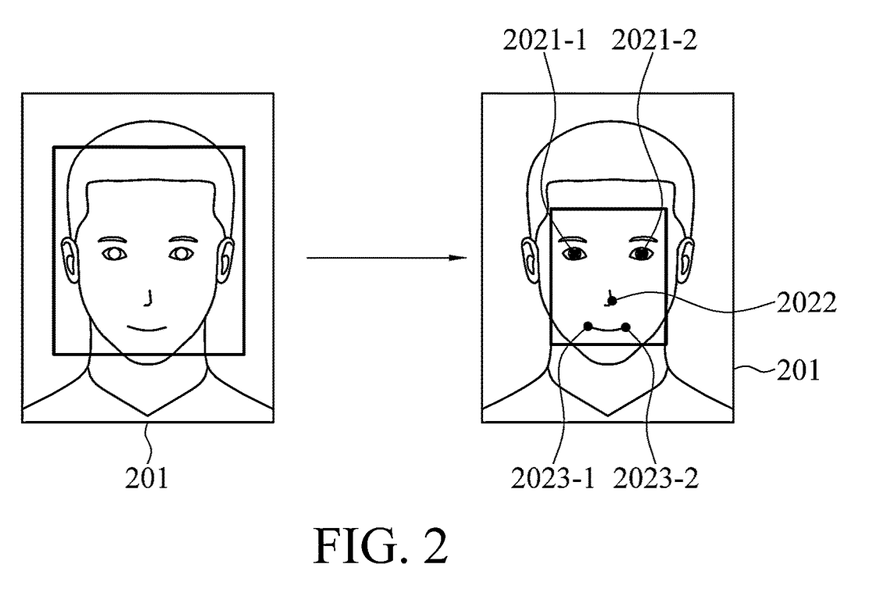
FIG. 2 illustrates a schematic diagram of positioning points of a training image according to an embodiment of the instant disclosure.
Figure 3:
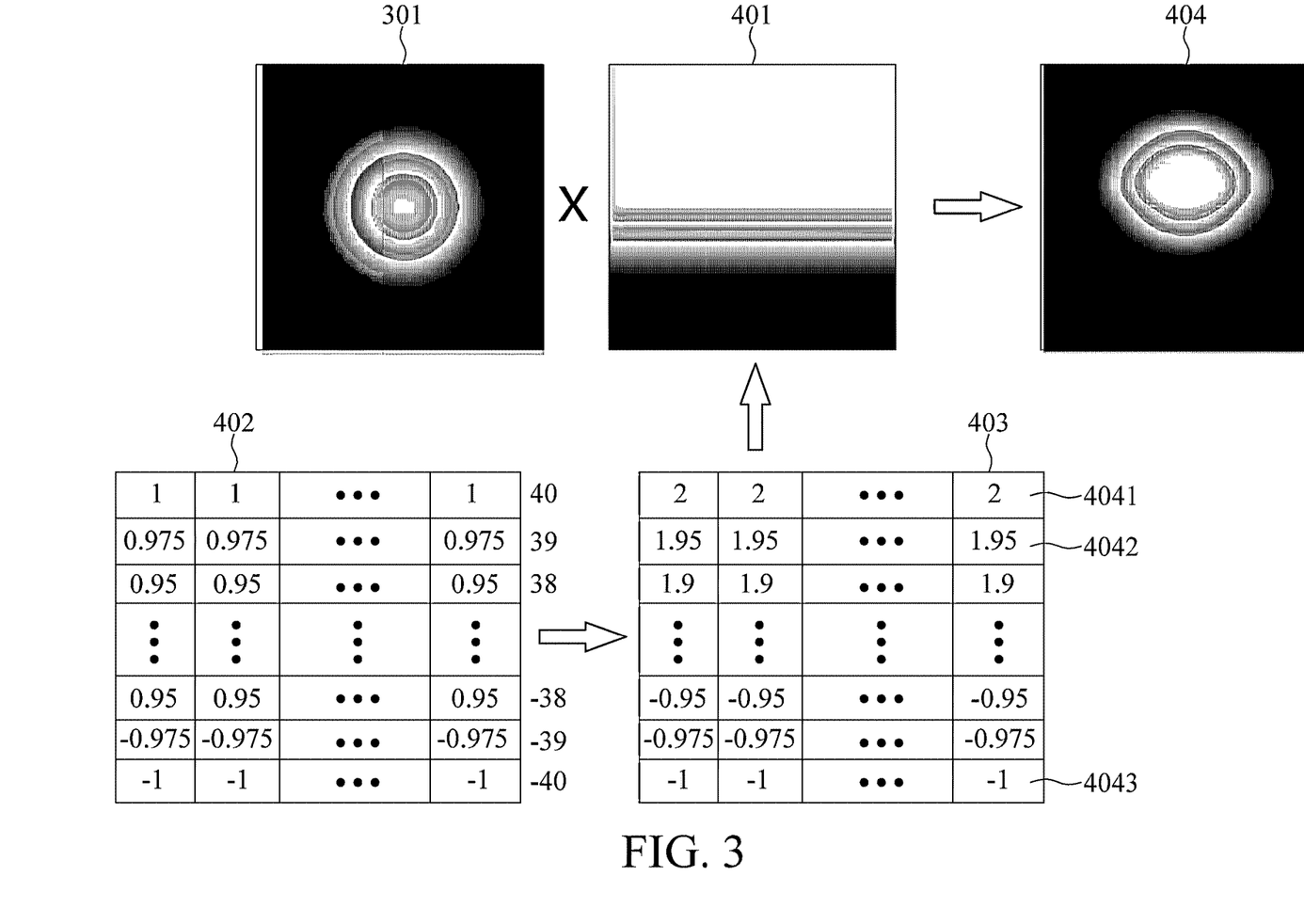
FIG. 3 illustrates a schematic diagram of a modified Gaussian mask according to an embodiment of the instant disclosure.
Figure 4:
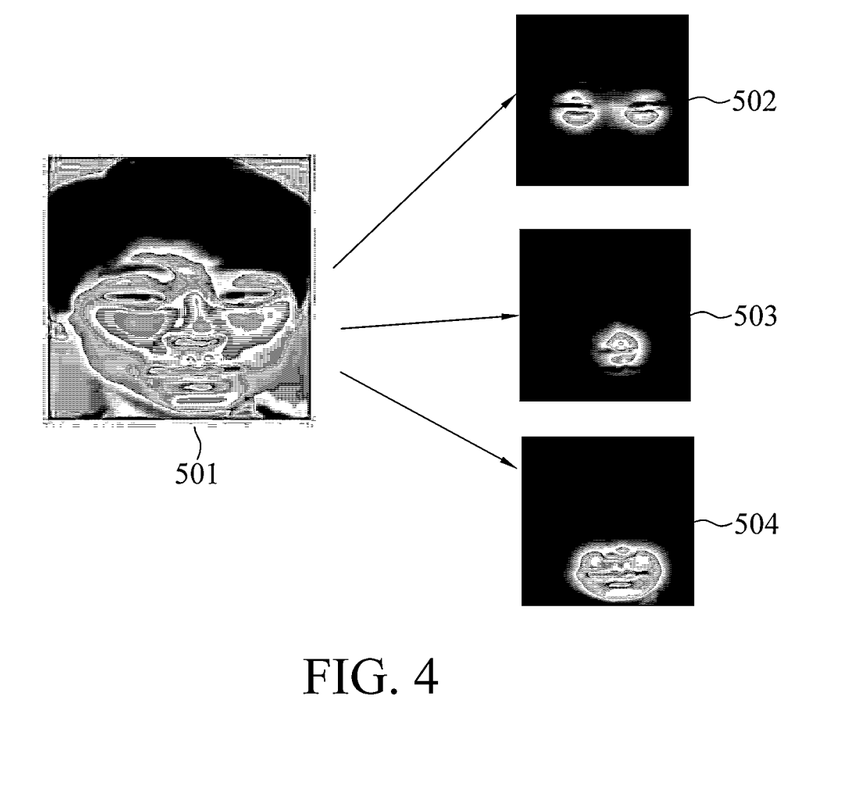
FIG. 4 illustrates schematic diagrams of a training image and training feature images according to an embodiment of the instant disclosure.

The processing units 101-1 through 101-N of the training system 100 will generate a training set based on the technical contents illustrated below regarding FIG. 2 through FIG. 4. The training set comprises a plurality of training images. Each of the training images has a classification label and a plurality of training feature images corresponding to a plurality of features of a face. The following will illustrate how to generate the training set. FIG. 2 illustrates a schematic diagram of positioning points of a training image according to an embodiment of the instant disclosure. FIG. 3 illustrates a schematic diagram of a modified Gaussian mask according to an embodiment of the instant disclosure. FIG. 4 illustrates schematic diagrams of a training image and training feature images according to an embodiment of the instant disclosure.

Please refer to FIG. 2 through FIG. 4 at the same time. In some embodiments of the instant disclosure, the features of the face are eyes, a nose, and a mouth. The processing units 101-1 through 101-N of the training system 100 may first receive a plurality of training images including faces of different people. In other words, each of the training images corresponds to one person. One person of the training set corresponds to one training classification. Consequently, a number of different people in the training set represents a number of training classifications. The training system 100 sets a classification label for each of the training images based on the person to which a corresponding one of the training images corresponds.

Based on the features of the face (the eyes, the nose, and the mouth in this embodiment), the processing units 101-1 through 101-N of the training system 100 detect locations of the features of the face (the eyes, the nose, and the mouth in this embodiment) of each of the training images using facial landmark localization method. Please refer to FIG. 2. The processing units 101-1 through 101-N of the training system 100 detect the features of the face of the training image 201 using the facial landmark localization method and obtain eye locations 2021-1, 2021-2, a nose location 2022, and mouth locations 2023-1, 2023-2 of the training image 201. Next, the training system 100 applies the Gaussian mask to the nose location 2022 and the mouth locations 2023-1, 2023-2 so as to obtain the training feature image of the nose and the training feature image of the mouth, respectively. The training system 100 applies the Gaussian mask to the eye locations 2021-1, 2021-2 so as to obtain the training feature image of the eyes.

Please refer to FIG. 4. FIG. 4 illustrates the training image 501 and the training feature image of the eyes 502, the training feature image of the nose 503, and the training feature image of the mouth 504 of the training image 501. As shown in FIG. 4, in this embodiment, the training feature image of the eyes 502 merely includes the features of eye portions of the training image 501, while the training feature image of the nose 503 and the training feature image of the mouth 504 include features of the nose portion and the mouth portion of the training image 501, respectively.

The Gaussian mask may be obtained using the following function:

$$\frac{1}{2\pi\sigma^2}\exp\left\{-\frac{x^2+y^2}{2\sigma^2}\right\}. \quad \text{(Function 1)}$$

Please refer to FIG. 3. A Gaussian mask image 301 is a two-dimensional Gaussian mask image with a size of 81×81 illustrated based on the Function 1 (wherein σ is set to 1). As shown in FIG. 3, when the Gaussian mask represented by the Gaussian mask image 301 is applied to an image, an intensity of a center portion of the image will be enhanced, and an intensity of a peripheral portion of the image is incrementally attenuated.

In order to obtain the training feature image of the eyes, a sigmoid function mask may be used. The Gaussian mask represented by the Gaussian mask image 301 is element-wise-multiplied by a sigmoid function mask represented by an image 401 to obtain a modified Gaussian mask 404.

In some embodiments, the generation of the sigmoid function mask is using the maximum values of elements in y-axis coordinates of the mask to normalize all elements in the y-axis coordinates, and magnifying the normalized positive values of all the elements in the y-axis coordinates by a factor of 1, and then taking values for each of the elements in y-axis coordinates using the sigmoid function mask. The sigmoid function mask is:

$$\frac{\alpha}{1+e^{-\beta t}}. \quad \text{(Function 2)}$$

Taking the 81×81 sigmoid function mask as an example, because the y-axis coordinates are −40 to 40, using 40 to normalize −40 through 40 yields 1, 0.975, 0.95, . . . , −0.95, −0.975, −1 as shown in a mask array 402. Then, positive values of 1, 0.975, 0.95, . . . , −0.95, −0.975, −1 are multiplied by 2 to yield 2, 1.95, 1.9, . . . , −0.95, −0.975, −1 as shown in a mask array 403. Next, the sigmoid function mask is used to take values from the mask array 403. For example, the value of an element 4041 of the mask array 403 is 2, and therefore using the sigmoid function (Function 2) yields a value of 1.99 (in this embodiment, the following is set: α=2, and β=4); the value of the element 4042 of the mask array 403 is 1.95, and therefore using the sigmoid function (Function 2) yields a value of 1.99; and the value of the element 4043 of the mask array 403 is −1, and therefore using the sigmoid function (Function 2) yields a value of 0.035. Following this process, the sigmoid function mask represented by the sigmoid function mask image 401 can be obtained.

It is worth illustrating that the size of the mask may be adjusted according to the size of the training image 201, and the instant disclosure is not limited to an 81×81 mask.

In some embodiments of the instant disclosure, the facial landmark localization method utilizes multi-task cascaded convolutional networks (MTCNN) to detect the locations of facial feature points.

It is worth illustrating that a person having ordinary skills in the art can easily change the features of the face to other portions according to requirements. The instant disclosure is not limited to using the eyes, the nose, and the mouth.

It is also worth illustrating that in some embodiments of the instant disclosure, the training set is generated by another system, and the training system 100 receives the training set generated by the another system from the exterior.

The following will illustrate in detail the training method and how the modules of the training system 100 cooperate with each other in some embodiments of the instant disclosure with reference to the accompanying drawings.

Figure 7:
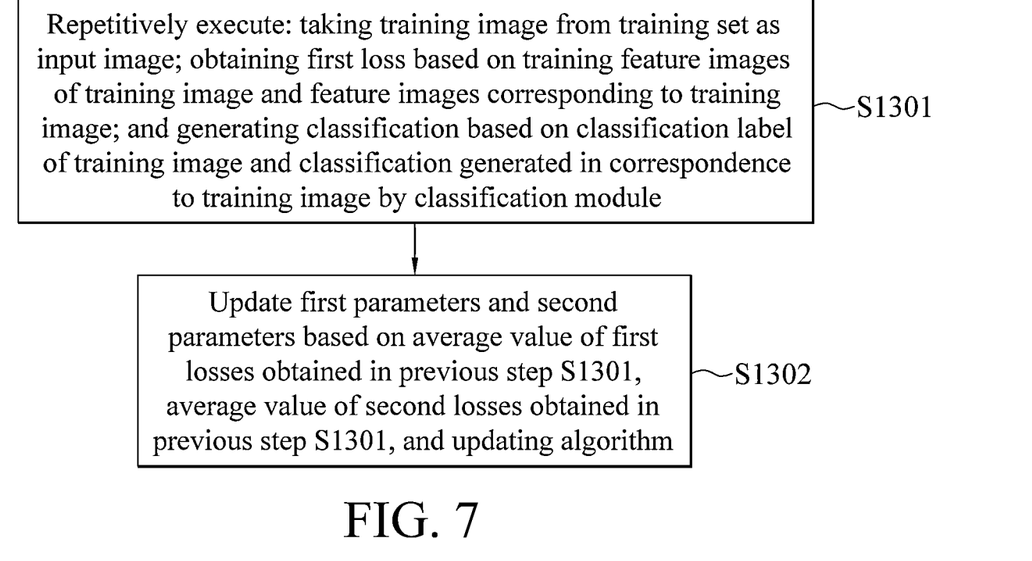
FIG. 7 illustrates a schematic flow chart of a training method according to some embodiments of the instant disclosure.

FIG. 7 illustrates a schematic flow chart of a training method according to some embodiments of the instant disclosure. Please refer to FIG. 1, FIG. 4, and FIG. 7 at the same time. In the embodiment shown in FIG. 7, the training method comprises performing the step S1301 and the step S1302 by the processing units 101-1 through 101-N in a training epoch. In the step S1301, the processing units 101-1 through 101-N repeatedly execute the following steps: taking a training image (such as the training image 501) from a training set (such as the training set generated by the training system 100) as the input image and inputting the input image to the encoder module 103; obtaining a first loss based on a plurality of training feature images (such as the training feature image of the eyes 502, the training feature images of the nose 503, and the training feature images 504) of the training image and the feature images generated by the shared decoder module 105 in correspondence with the training image; and obtaining a second loss based on a classification label (such as, as mentioned above, the classification label set for the training image 501 based on the person to whom the training image corresponds) of the training image and the classification generated by the classification module 106 in correspondence with the training image.

After all training images of the training set which are preset to be inputted to the encoder module 103 have been inputted to the encoder module 103 and the first losses and the second losses are obtained, the processing units 101-1 through 101-N execute the step S1302. In the step S1302, the first parameters and the second parameters are updated based on an average value of all of the first losses obtained in the step S1301, an average value of all of the second losses obtained in the step S1301, and an updating algorithm. Adopting the average value of the first losses and the average value of the second losses allows the updating of the first parameters and the updating of the second parameters not to be influenced by a number of the training images.

The updating algorithm may be one of the gradient descent (GD) method, the stochastic gradient descent (SGD) method, the momentum method, the RMSProp method, the Adagrad method, and the adaptive moment estimation (Adam) method, or may be other updating algorithms. The instant disclosure does not set limitation on what updating algorithm to use.

Figure 51:
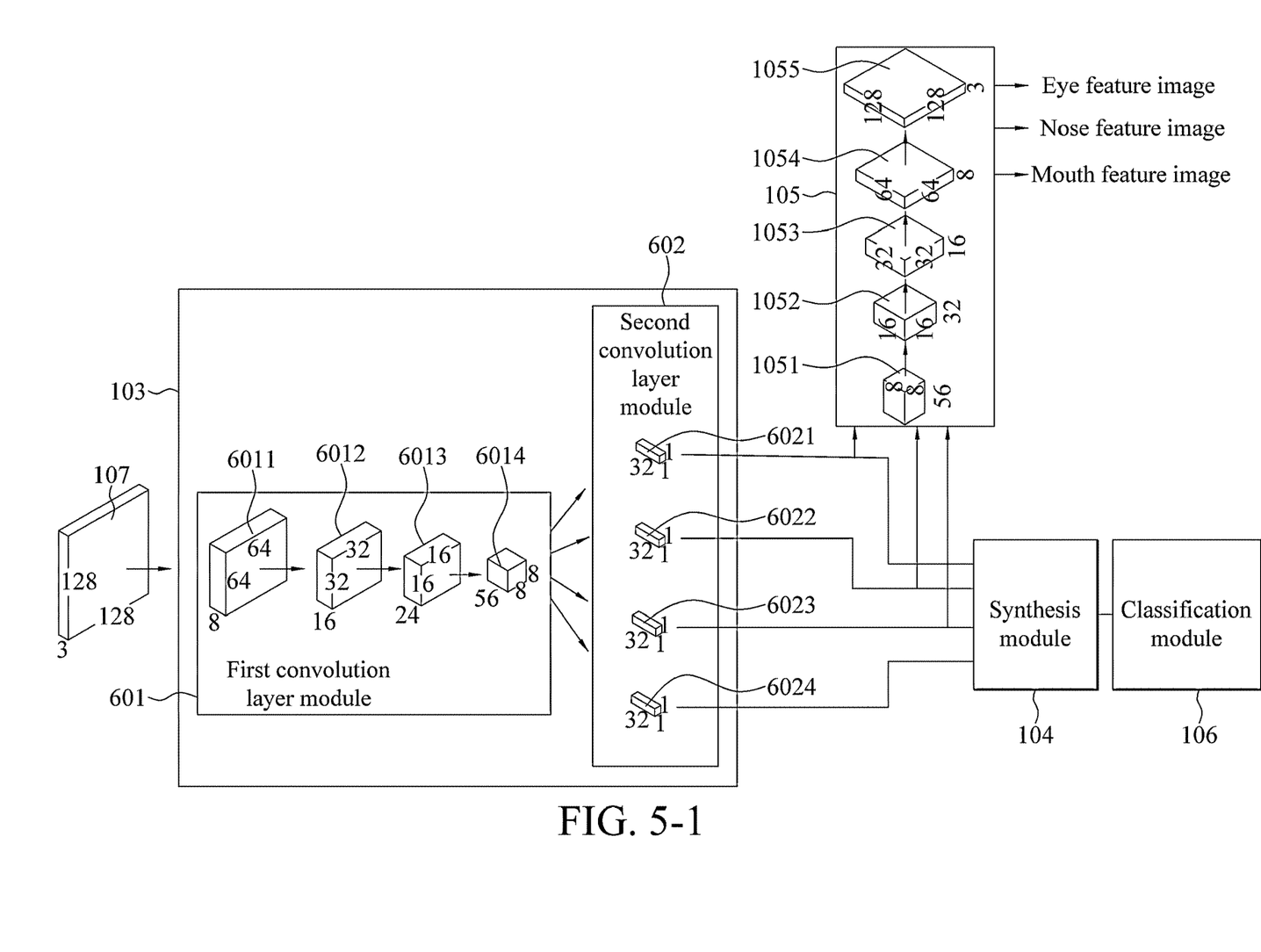
Figure 52:
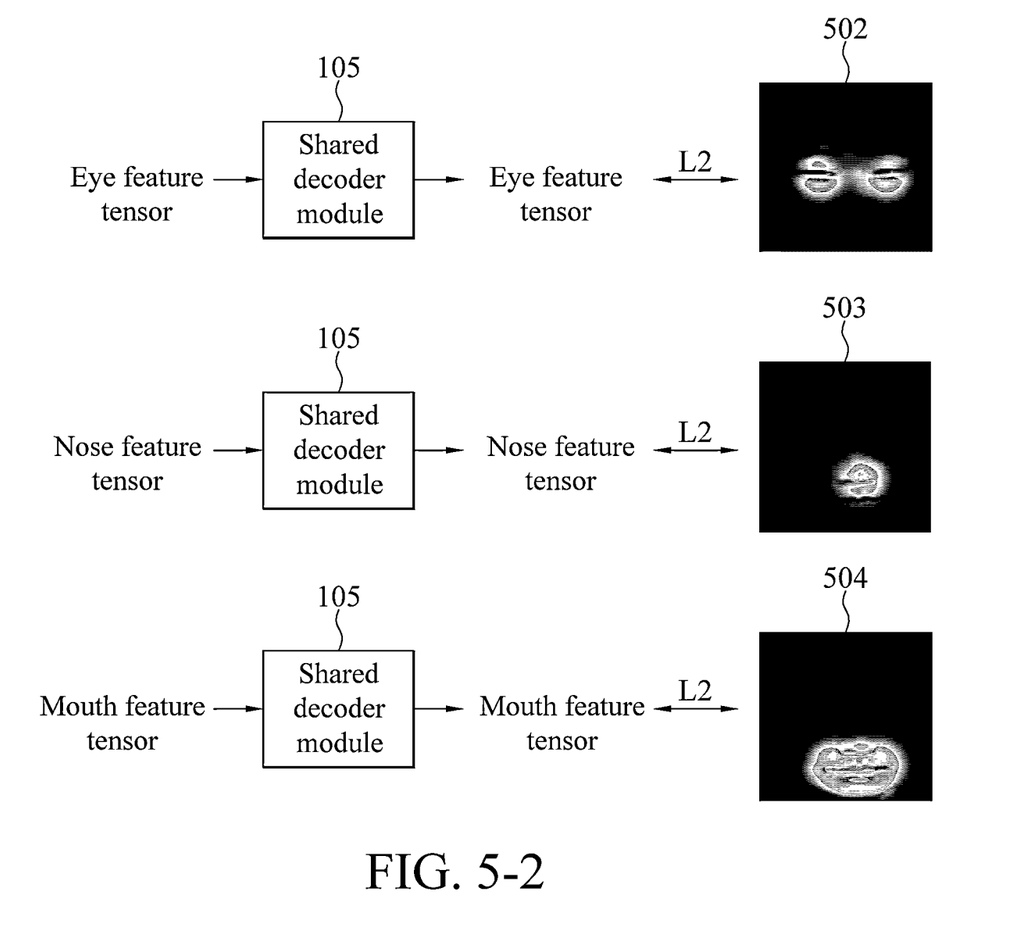

FIG. 5-1 illustrates a schematic module diagram of a training system according to some embodiments of the instant disclosure. FIG. 5-2 illustrates schematic diagrams showing correspondences between feature images and training feature images according to some embodiments of the instant disclosure.

Please refer to FIG. 5-1. In the embodiments shown in FIG. 5-1, the encoder module 103 comprises a first convolution layer module 601 and a second convolution layer module 602. The first convolution layer module 601 is configured to receive the input image 107 and output a second tensor corresponding to the input image 107. The second convolution layer module 602 is configured to receive the second tensor so as to generate the first tensors.

As shown in FIG. 5-1, in some embodiments of the instant disclosure, the first convolution layer module 601 comprises third convolution layer modules 6011-6014 connected in series. The third convolution layer modules 6011-6014 are configured to capture the features of the input image 107. Each of the third convolution layer modules 6011-6014 is configured to output a 3-axis tensor. The three axes are denoted as a width axis, a height axis, and a channel axis, respectively. The size of each of the axes is shown on each of the convolution layer modules. For example, for the third convolution layer module 6011, the width is denoted as 64, the height is denoted as 64, and the channel is denoted as 8. This indicates that the third convolution layer module 6011 is applied to the input image 107 with eight convolution kernels. The tensors obtained by applying the third convolution layer module 6011 with eight convolution kernels are concatenated to obtain an output tensor whose size of the width axis, size of the height axis, and channel number of the channel axis are 64, 64, and 8, respectively. Such a tensor is called a tensor with dimensions of 64×64×8. The input image 107 has sizes of 128 and 128 for the height axis and the width axis, respectively, and channel number of 3 for the channel axis means that the input image 107 has a size of 128×128 and channels correspond to three colors of R, G, B, respectively.

The second convolution layer module 602 comprises fourth convolution layer modules 6021-6024 connected in parallel. The fourth convolution layer modules 6021-6024 are configured to receive the tensor outputted by the third convolution layer module 6014, respectively. Besides, as shown in FIG. 5-1, the fourth convolution layer modules 6021-6024 respectively process the tensors outputted by the third convolution layer module 6014 with their own 32 convolution kernels. Therefore, the fourth convolution layer modules 6021-6024 each output an output tensor whose size of the width axis, size of the height axis, and channel number of the channel axis are 1, 1, and 32, respectively. The tensors outputted by the fourth convolution layer modules 6021-6024 are the first tensors outputted by the encoder module 103.

In some other embodiments of the instant disclosure, the first convolution layer module 601 is set to output a tensor of 1×1×128, and then this tensor is divided into 4 tensors of 1×1×32 by a dividing module based on the channel axis. These 4 tensors are taken as the first tensors. The dividing module may operate based on an order of elements of the channel axis. Taking every 32 channels as one group, the tensor of 1×1×128 outputted by the first convolution layer module 601 is divided into the 4 tensors of 1×1×32. Of course, the dividing module may also perform dividing along the channel axis based on other orders, and the instant disclosure is not limited thereto. The structure of the dividing module is a commonly used manner in the field of neural network and therefore is not illustrated here.

In this embodiment, the tensors outputted by the fourth convolution layer modules 6021-6024 are set as an eye feature tensor corresponding to the eye feature, a nose feature tensor corresponding to the nose feature, and a mouth feature tensor corresponding to the mouth feature, respectively.

In this embodiment, the shared decoder module 105 comprises transposed convolution layer modules 1051-1055 connected in series. The shared decoder module 105 is used to receive the eye feature tensor, the nose feature tensor, and the mouth feature tensor, respectively, and generate a feature image correspondingly and respectively.

Each of the transposed convolution layer modules 1051-1055 outputs a 3-axis tensor. The three axes are respectively denoted as the width axis, the height axis, and the channel axis. The size of each of the axes is shown on each of the transposed convolution layer modules. For example, for the transposed convolution layer module 1051, the width is denoted as 8, the height is denoted as 8, and the channel is denoted as 56. This indicates that the transposed convolution layer module 1051 is applied to the received tensor with 56 convolution kernels. The tensors obtained by applying the transposed convolution layer module 1051 with 56 convolution kernels are concatenated to obtain an output tensor whose size of the width axis, size of the height axis, and channel number of the channel axis are 8, 8, and 56, respectively.

In this embodiment, the first parameters comprise all of the parameters of the convolution kernels of all of the convolution layer modules in the first convolution layer module 601 and the second convolution layer module 602. The second parameters comprise all of the parameters of the convolution kernels of all the convolution layer modules in the shared decoder module 105.

In this embodiment, the tensor outputted by the transposed convolution layer module 1055 is referred to as the feature image. Besides, in this embodiment, the feature images corresponding to the eye feature tensor, the nose feature tensor, and the mouth feature tensor are called an eye feature image, a nose feature image, and a mouth feature image, respectively.

It is worth illustrating that the eye feature tensor, the nose feature tensor, and the mouth feature tensor are respectively inputted to the shared decoder module 105 according to an order.

Please refer to FIG. 5-2. In this embodiment, after the transposed convolution layer module 1055 outputs the eye feature image, the processing units 101-1, 101-2 through 101-N calculate an $L_2$ distance between the eye feature image and the training feature image of the eyes 502. Similarly, the $L_2$ distance between the nose feature image and the training feature image of the nose 503 and the $L_2$ distance between the mouth feature image and the training feature image of the mouth 504 can be calculated. The processing units 101-1, 101-2 through 101-N take a sum of the three $L_2$ distances as the first loss. The action of taking the $L_2$ distances of the images as a loss function is referred to as adopting $L_2$ loss.

It is worth illustrating that the dimensions of some of the feature tensors of the first tensors may be different from the dimensions of other ones of the feature tensors of the first tensors. In other words, the feature tensors may have more elements to represent the features of a face.

In the embodiment shown in FIG. 5-1, the synthesis module 104 synthesizes the 4 tensors of 1×1×32 into a tensor of 1×1×128 based on the channel axes of the received tensors. The tensor of 1×1×128 may be seen as a vector.

It is worth illustrating that in the embodiment shown in FIG. 5-1, the dimensions of the first tensors generated by the encoder module 103 are all 1×1×32. Consequently, in some embodiments, the synthesis module 104 just needs to combine the first tensors based on the channel axes of the received first tensors to obtain a vector. The synthesis module 104 may also receive the first tensors of other dimensions: the synthesis module 104 first reshapes the received first tensors into tensors of 1×1×P (where P is a positive integer) and then combines all the first tensors based on the channel axes to obtain a vector.

In some embodiments of the instant disclosure, the classification module 106 comprises a first fully connected layer module and a second fully connected layer module. In such embodiments, the training classifications of the training set are denoted by one-hot encodings. For example, (1, 0, ..., 0, ..., 0) is used to represent a person in the training set, (0, 1, ..., 0, ..., 0) is used to represent another person in the training set, and so on. The first fully connected layer module is configured to correspond to the one-hot encodings, so that the number of outputs equals the classification number of the training classifications of the training set.

When the classification module 106 receives the vector outputted by the synthesis module 104 and outputs the output of the classification module 106 through the second fully connected layer module, the processing units 101-1 through 101-N calculate a sum of squared errors (SSE) between the output of the classification module 106 and the one-hot encoding of the classification label of the training image so as to obtain the second loss. For example, if the output of the classification module 106 corresponding to the training image is (0.8, 0.1, 0) and the one-hot encoding of the classification label of the training image is (1, 0, 0), the second loss can be calculated as follows:

$$\frac{1}{2}\{(0.8-1)^2 + (0.1-0)^2 + (0-0)^2\} = 0.025.$$

In some embodiments of the instant disclosure, the classification module 106 comprises a first fully connected layer module, a second fully connected layer module, and a softmax layer. In such embodiments, the training classifications of the training set are represented by one-hot encodings. The softmax layer is configured to make the number of outputs equal to the number of the training classifications of the training set, and the $i^{th}$ output of the softmax layer corresponds to a probability of the $i^{th}$ training classification of the training set.

The processing units 101-1 through 101-N calculate a cross entropy error between the output of the classification module 106 and the one-hot encoding of the classification label of the training image so as to obtain the second loss. For example, if the output of the classification module 106 corresponding to the training image is (0.3, 0.2, 0.5) and the one-hot encoding of the classification label of the training image is (0, 1, 0), the second loss can be calculated as follows: −(0·log 0.3+1·log 0.2+0·log 0.5).

In an embodiment, let loss represent a total average loss, let $loss_{first}$ represent an average of the first losses, let $loss_{second}$ represent an average of the second losses, and let num represent the number of features of a face (such as the three features of eyes, nose, and mouth in the previous embodiments), then $$loss = \frac{\alpha}{num} loss_{first} + loss_{second},$$

wherein a range of α is 0.01-0.1.

In the step S1302 of this embodiment, the processing units 101-1 through 101-N update the first parameters and the second parameters based on the total average loss and the updating algorithm.

Figure 6:
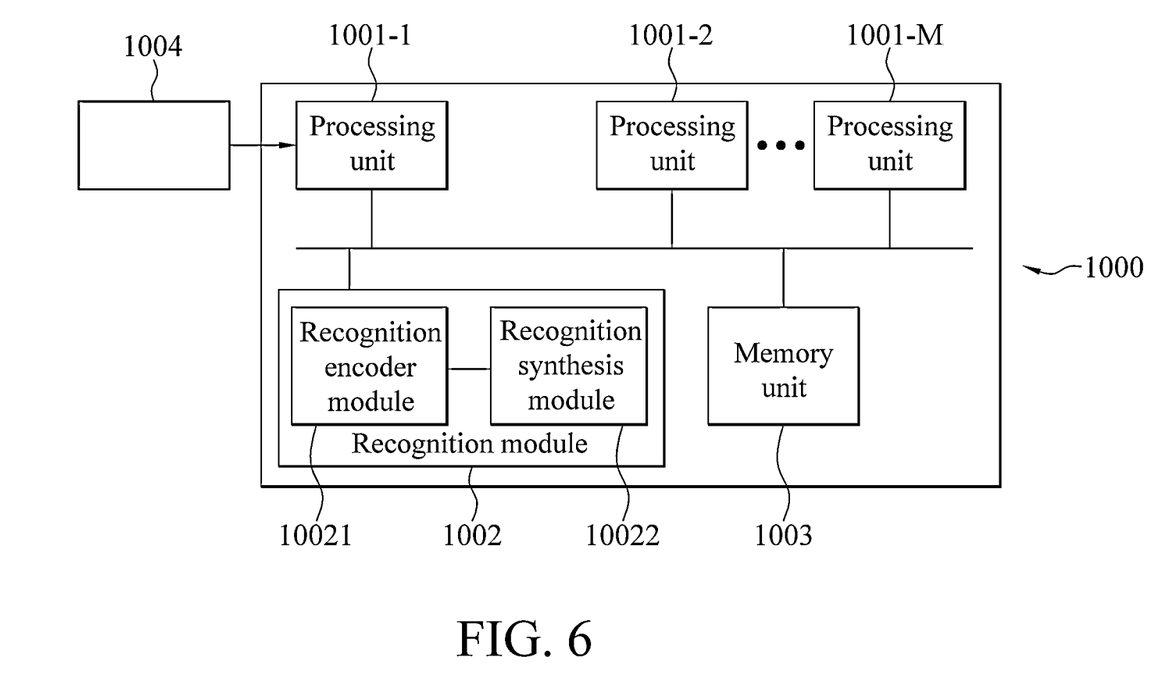
FIG. 6 illustrates a schematic block diagram of a recognition system according to some embodiments of the instant disclosure.

FIG. 6 illustrates a schematic block diagram of a recognition system according to some embodiments of the instant disclosure. Please refer to FIG. 6. The recognition module 1000 comprises processing units 1001-1, 1001-2 through 1001-M, a recognition module 1002, and a memory unit 1003, where M is a positive integer. The processing units 1001-1 through 1001-M are configured to receive an image to be recognized 1004. The recognition module 1002 comprises a recognition encoder module 10021 and a recognition synthesis module 10022. The recognition encoder module 10021 adopts the encoder module 103 which has completed being trained by the training system 100. The recognition encoder module 10021 is configured to store trained ones of the first parameters obtained by the training system 100 and to receive an input image and generate a plurality of tensors. The tensors comprise a plurality of feature tensors. The feature tensors correspond to a plurality of features of a face (here, the term "tensors" is used to refer to the outputs of the recognition encoder module 10021 so as to differentiate such outputs from the aforementioned first tensors, and these tensors comprise a plurality of feature tensors which correspond to a plurality of features of a face). The recognition encoder module 10021 is configured to receive the image to be recognized 1004 through the processing units 1001-1 through 1001-M. The recognition synthesis module 10022 adopts the synthesis module 104 corresponding to the encoder module 103. The recognition synthesis module 10022 is configured to receive the tensors generated by the recognition encoder module 10021 and generate an vector corresponding to the input image based on the received tensors (in order to be differentiated from the vector generated by the synthesis module 104 based on the received first tensors, the vector corresponding to the input image and generated by the recognition synthesis module 10022 based on the received tensors is referred to as an output vector corresponding to the input image).

The recognition system of the instant disclosure can be applied to embodiments with a single user or a plurality of users. The following will illustrate respectively.

Figure 8:
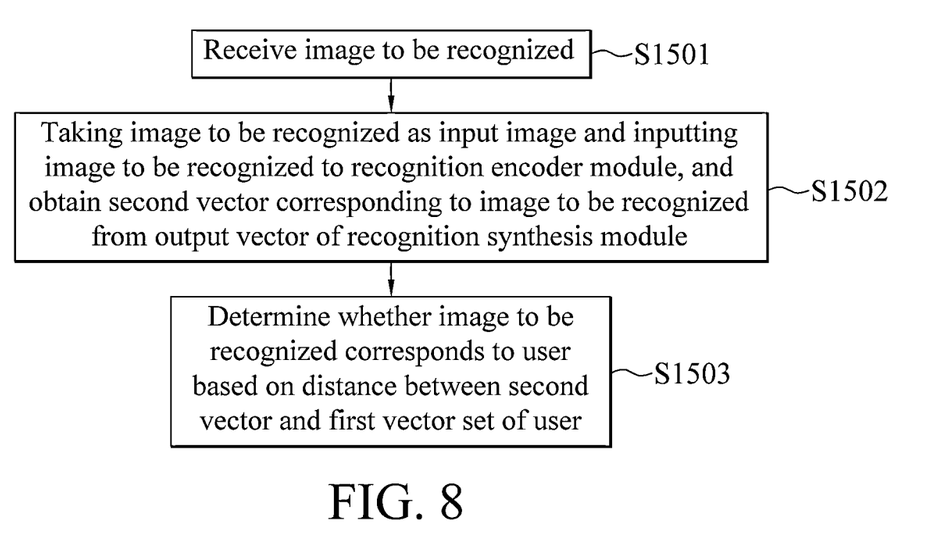
FIG. 8 illustrates a schematic flow chart of a recognition method according to some embodiments of the instant disclosure.

In some embodiments applied to a single user of the recognition system of the instant disclosure, the processing units 1001-1 through 1001-M receive at least one image of the user from the exterior. Next, the processing units 1001-1 through 1001-M input the at least one image to the recognition encoder module 10021. Then, the processing units 1001-1 through 1001-M obtain at least one first vector from the recognition synthesis module 10022, wherein each of the first vectors is an output vector generated by the recognition encoder module 10021 and the recognition synthesis module 10022 in correspondence with an image of the user. The processing units 1001-1 through 1001-M then store the at least one first vector to the memory unit 1003. A set constituted by the at least one first vector is referred to as a first vector set. FIG. 8 illustrates a schematic flow chart of a recognition method according to some embodiments of the instant disclosure. Please refer to FIG. 6 and FIG. 8 at the same time. Following the aforementioned embodiment, a recognition method comprises performing the step S1501 through the step S1503 by the processing units 1001-1 through 1001-M. In the step S1501, the processing units 1001-1 through 1001-M receive the image to be recognized 1004. In the step S1502, the processing units 1001-1 through 1001-M take the image to be recognized as an input image and input the image to be recognized 1004 to the recognition encoder module 10021 and obtain a second vector corresponding to the image to be recognized 1004 from the output vector of the recognition synthesis module 10022 (that is, taking the output vector of the recognition synthesis module 10022 as the second vector of the image to be recognized 1004). In the step S1503, based on a distance between the second vector and the first vector set of the user, the processing units 1001-1 through 1001-M determine whether the image to be recognized 1004 corresponds to the user.

The distance between the second vector and the first vector set of the user may be defined in various ways. For example, one may calculate a distance between the second vector and each of the first vectors and then take the average value or maximum value of these distances as the distance between the second vector to the first vector set of the user.

In some embodiments of the instant disclosure, the step S1503 further comprises determining that the image to be recognized 1004 corresponds to the user in response to that the distance between the second vector and the first vector set of the user is less than a preset value.

Figure 9:
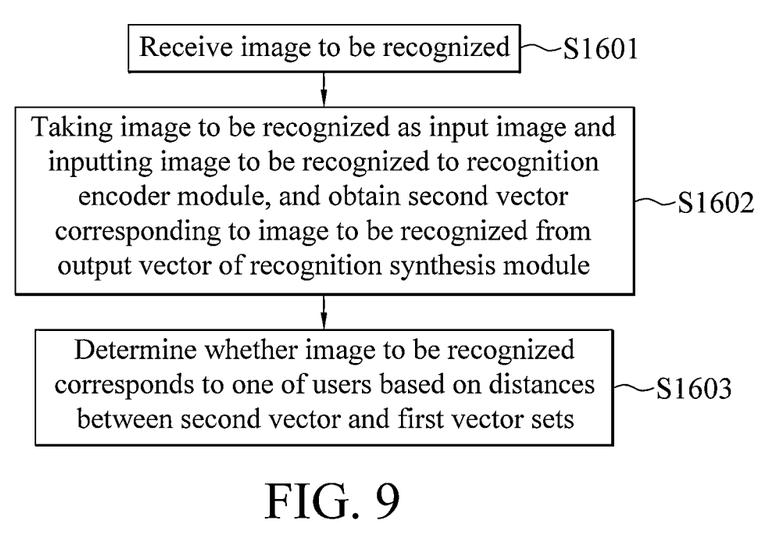
FIG. 9 illustrates a schematic flow chart of a recognition method according to some embodiments of the instant disclosure.

In some embodiments applied to multiple users of the recognition system of the instant disclosure, the processing units 1001-1 through 1001-M receive at least one image of each of the users from the exterior for the multiple users. The processing units 1001-1 through 1001-M input the at least one received image of each of the users to the recognition encoder module 10021 so as to obtain a plurality of sets of user vectors from the recognition synthesis module 10022. Each set of the user vectors corresponds to one user, and each set of the user vectors comprises at least one vector. Similarly to the aforementioned embodiments, each of the at least one first vector of each set of the user vectors is an output vector generated by the recognition encoder module 10021 and the recognition synthesis module 10022 in correspondence with an image of one of the users. The processing units 1001-1 through 1001-M store the sets of the user vectors to the memory unit 1003. Because the at least one first vector of each set of the user vectors constitutes the first vector set of one user, each user corresponds to one of the first vector sets. FIG. 9 illustrates a schematic flow chart of a recognition method according to some embodiments of the instant disclosure. Please refer to FIG. 6 and FIG. 9 at the same time. Continuing the foregoing embodiment, in the embodiment shown in FIG. 9, the recognition method comprises performing the step S1601 through the step S1603 by the processing units 1001-1, 1001-2 through 1001-M. In the step S1601, the image to be recognized 1004 is received. In the step S1602, the image to be recognized 1004 is taken as the input image and inputted to the recognition encoder module 10021, and the second vector corresponding to the image to be recognized 1004 is obtained through the output of the recognition synthesis module 10022. In the step S1603, the distance between the second vector and each of the first vectors is calculated, wherein the "distance" may be defined according to the aforementioned methods. The processing units 1001-1, 1001-2 through 1001-M then determine whether the image to be recognized 1004 corresponds to one of the users based on the distances between the second vector and the first vector sets.

In some embodiments of the instant disclosure, the step S1603 comprises determining that the image to be recognized 1004 corresponds to a first user of the users corresponding to the first distance in response to that a first distance, which is a smallest distance of the distances, is less than a preset value.

The training system and training method provided by the foregoing embodiments adopt the structure of encoder module-shared decoder module. During the process of model training, losses constituted by errors between restored images of features generated by the shared decoder module and training feature images corresponding to the features are added to limit the process of the model training. Besides, in some embodiments of the instant disclosure, during the processing of the model training, using restoration processes of the features of a face of a shared decoder module at the same time allows the shared decoder module to restore the appearances of the facial features in response to different facial feature information, and thus forcefully make the inputs of the shared decoder module just include information about facial features. As a result, regarding the vectors generated by the synthesis module, a part of the dimensions are limited to a plurality of features of a face. The recognition system provided by some embodiments of the instant disclosure utilizes the vectors generated by a neural network trained in this way. Hence, in some embodiments of the instant disclosure, when some features of the face in the image to be recognized is masked, the recognition system is still able to complete identity recognition through other unmasked feature information.

Although the technical context of the instant disclosure has been disclosed with the preferred embodiments above, the embodiments are not meant to limit the instant disclosure. Any adjustment and retouch done by any person skill in the art without deviating from the spirit of the instant disclosure shall be covered by the scope of the instant disclosure. Therefore, the protected scope of the instant disclosure shall be defined by the attached claims.

What is claimed is:

1. A training system, comprising:
at least one processing unit and a neural network module, wherein the neural network module comprises:
an encoder module having a plurality of first parameters and configured to receive an input image and output a plurality of first tensors, wherein the first tensors comprise a plurality of feature tensors, and the feature tensors correspond to a plurality of features of a face;
a shared decoder module having a plurality of second parameters and configured to receive the feature tensors so as to generate a plurality of feature images;
a synthesis module configured to receive the first tensors so as to generate a vector; and
a classification module configured to receive the vector so as to generate a classification:
the at least one processing unit is configured to perform in a training epoch:
(a) repetitively executing: taking a training image from a training set as the input image: obtaining a first loss based on a plurality of training feature images of the training image and the feature images corresponding to the training image; and obtaining a second loss based on a classification label of the training image and the classification generated by the classification module in correspondence with the training image; and
(b) updating the first parameters and the second parameters based on an average value of all of the first losses obtained in the step (a), an average value of all of the second losses obtained in the step (a), and an updating algorithm.

2. The training system according to claim 1, wherein the encoder module comprises a first convolution layer module and a second convolution layer module, the first convolution layer module is configured to receive the input image and output a second tensor corresponding to the input image, and the second convolution layer module is configured to receive the second tensor so as to generate the first tensors.

3. The training system according to claim 2, wherein the first convolution layer module comprises a plurality of third convolution layer modules connected in series, the second convolution layer module comprises a plurality of fourth convolution layer modules connected in parallel, and the fourth convolution layer modules are configured to respectively output the first tensors.

4. The training system according to claim 3, wherein each of the fourth convolution layer modules converts a third tensor into a fourth tensor using a plurality of convolution kernels, a dimension of the fourth tensor is 1×1×L, where L denotes a number of channels of the fourth tensor, a number of the convolution kernels is N, and N is a positive integer: all of the fourth tensors corresponding to the fourth convolution layer modules constitute the first tensors.

5. The training system according to claim 4, wherein the synthesis module combines the first tensors based on channel axes of the first tensors so as to generate the vector.

6. The training system according to claim 5, wherein the classification module comprises a first fully connected layer module and a second fully connected layer module, an output number of the second fully connected layer module is a classification number of a training classification of the training set, the training classification of the training set is represented by a one-hot encoding, and the output number of the second fully connected layer module is configured to correspond to the one-hot encoding.

7. The training system according to claim 1, wherein the shared decoder module comprises a plurality of transposed convolution layer modules connected in series, the transposed convolution layer modules are configured to respectively receive the feature tensors, each of the feature tensors is correspondingly converted into a correspondence feature image, and the correspondence feature images constitute the feature images.

8. The training system according to claim 1, wherein the encoder module comprises a first convolution layer module and a dividing module, the first convolution layer module is configured to receive the input image and output a second tensor corresponding to the input image, and the dividing module is configured to receive the second tensor and divide the second tensor based on a channel axis of the second tensor so as to generate the first tensors.

9. The training system according to claim 1, wherein the first loss adopts $L_2$ loss.

10. The training system according to claim 1, wherein the step (b) comprises:
(b1) calculating a total average loss based on the average value of the first losses and the average value of the second losses, wherein the total average loss is the average value of the first losses multiplied by a coefficient and then added with the average value of the second losses, and the coefficient is a sub coefficient divided by a number of the features; and
(b2) updating the first parameters and the second parameters based on the total average loss and the updating algorithm: wherein the sub coefficient is selected from an interval of [0.01,0.1].

11. A training method, used to train a neural network module, wherein the training method is executed by at least one processing unit, and the neural network module comprises: an encoder module having a plurality of first parameters and configured to receive an input image and output a plurality of first tensors, wherein the first tensors comprise a plurality of feature tensors, and the feature tensors correspond to a plurality of features of a face: a shared decoder module having a plurality of second parameters and configured to receive the feature tensors so as to generate a plurality of feature images; a synthesis module configured to receive the first tensors so as to generate a vector; and a classification module configured to receive the vector so as to generate a classification; and the training method comprises performing in a training epoch:
- (a) repetitively executing: taking a training image from a training set as the input image: obtaining a first loss based on a plurality of training feature images of the training image and the feature images corresponding to the training image; and obtaining a second loss based on a classification label of the training image and the classification generated by the classification module in correspondence with the training image; and
- (b) updating the first parameters and the second parameters based on an average value of all of the first losses obtained in the step (a), an average value of all of the second losses obtained in the step (a), and an updating algorithm.

12. The training method according to claim 11, wherein the encoder module comprises a first convolution layer module and a second convolution layer module, the first convolution layer module is configured to receive the input image and output a second tensor corresponding to the input image, and the second convolution layer module is configured to receive the second tensor so as to generate the first tensors.

13. The training method according to claim 12, wherein the first convolution layer module comprises a plurality of third convolution layer modules connected in series, the second convolution layer module comprises a plurality of fourth convolution layer modules connected in parallel, and the fourth convolution layer modules are configured to respectively output the first tensors.

14. The training method according to claim 13, wherein each of the fourth convolution layer modules converts a third tensor into a fourth tensor using a plurality of convolution kernels, a dimension of the fourth tensor is 1×1×L, where L denotes a number of channels of the fourth tensor, a number of the convolution kernels is N, and N is a positive integer: all of the fourth tensors corresponding to the fourth convolution layer modules constitute the first tensors.

15. The training method according to claim 14, wherein the synthesis module combines the first tensors based on channel axes of the first tensors so as to generate the vector.

16. The training method according to claim 11, wherein the shared decoder module comprises a plurality of transposed convolution layer modules connected in series, the transposed convolution layer modules are configured to respectively receive the feature tensors, each of the feature tensors are correspondingly converted into a correspondence feature image, and the correspondence feature images constitute the feature images.

17. The training method according to claim 11, wherein the encoder module comprises a first convolution layer module and a dividing module, the first convolution layer module is configured to receive the input image and output a second tensor corresponding to the input image, and the dividing module is configured to receive the second tensor and divide the second tensor based on a channel axis of the second tensor so as to generate the first tensors.

18. The training method according to claim 11, wherein the step (b) comprises:
- (b1) calculating a total average loss based on the average value of the first losses and the average value of the second losses, wherein the total average loss is the average of the first losses multiplied by a coefficient and then added with the average of the second losses, and the coefficient is a sub coefficient divided by a number of the features; and
- (b2) updating the first parameters and the second parameters based on the total average loss and the updating algorithm: wherein the sub coefficient is selected from an interval of [0.01,0.1].

19. A recognition system using the first parameters of the encoder module obtained through a training of the training system according to claim 1, wherein the recognition system comprises:
- at least one processing unit;
- a recognition encoder module, wherein the recognition encoder module is configured to store trained ones of the first parameters and configured to receive an input image and generate a plurality of tensors, and a plurality of feature tensors of the tensors correspond to a plurality of features of a face;
- a recognition synthesis module configured to receive the tensors so as to generate an output vector corresponding to the input image; and
- a memory unit configured to store a first vector set, wherein the first vector set comprises at least one first vector, and the at least one first vector is the output vector generated by the recognition encoder module and the recognition synthesis module in correspondence with at least one image of a user; wherein the at least one processing unit is configured to execute:
- (a) receiving an image to be recognized;
- (b) taking the image to be recognized as the input image and inputting the image to be recognized to the recognition encoder module, and obtaining a second vector corresponding to the image to be recognized from the output vector of the recognition synthesis module; and
- (c) determining whether the image to be recognized corresponds to the user based on a distance between the second vector and the first vector set of the user.

20. The recognition system according to claim 19, wherein the step (c) comprises:
- (c1) in response to that the distance is less than a preset value, determining that the image to be recognized corresponds to the user.

* * * * *